W. S. MILLER.
SALTING MACHINE.
APPLICATION FILED APR. 7, 1910.
978,615.
Patented Dec. 13, 1910.
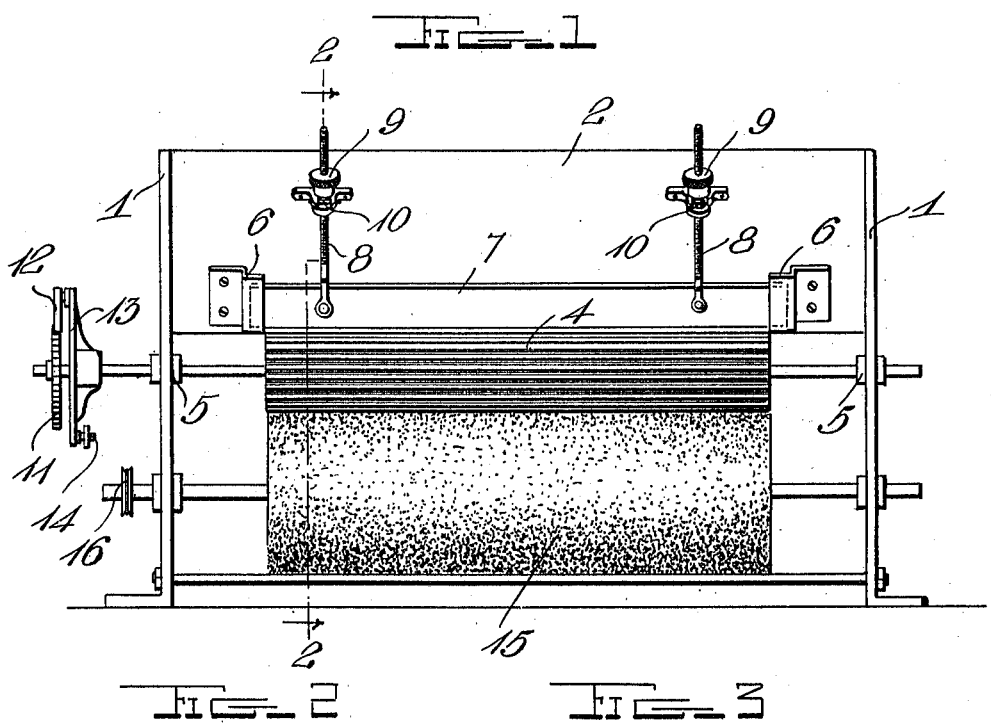
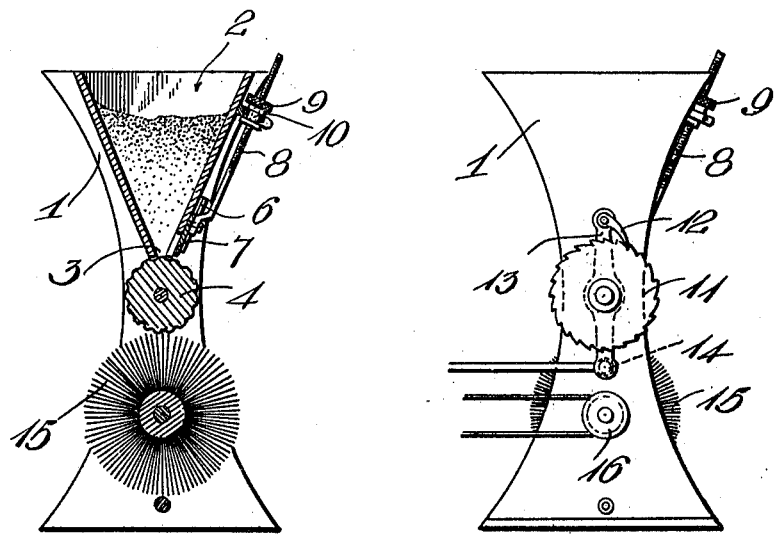
Witnesses
Inventor
Wilson S. Miller
by H. B. Willson & Co.
Attorneys

UNITED STATES PATENT OFFICE.

WILSON S. MILLER, OF ST. LOUIS, MISSOURI.

SALTING-MACHINE.

978,615.  Specification of Letters Patent.  Patented Dec. 13, 1910.

Application filed April 7, 1910. Serial No. 553,975.

*To all whom it may concern:*

Be it known that I, WILSON S. MILLER, a citizen of the United States, residing at St. Louis city, and State of Missouri, have invented certain new and useful Improvements in Salting-Machines; and I do declare the following to be a full, clear, and exact description of the invention, such as will enable others skilled in the art to which it appertains to make and use the same.

This invention relates to improvements in salting machines for crackers, cakes and the like.

One object of the invention is to provide a salting machine of this character having an improved construction of feeding mechanism whereby the salt is evenly fed from the machine and uniformly distributed over the crackers.

Another object is to provide means whereby the feeding mechanism may be quickly and evenly adjusted to feed more or less salt to the distributing mechanism.

With the foregoing and other objects in view, the invention consists of certain novel features of construction, combination and arrangement of parts as will be more fully described and particularly pointed out in the appended claim.

In the accompanying drawings, Figure 1 is a front view of a salting machine constructed in accordance with the invention; Fig. 2 is a vertical section taken on line 2—2 in Fig. 1, and Fig. 3 is an end view.

In the embodiment of the invention I provide a supporting frame 1 in the upper portion of which is arranged a hopper 2 for holding the salt. The side walls of the hopper 2 incline inwardly and downwardly and between the lower edges of said inclined side and end walls is formed a salt discharging slot 3. Arranged below the discharge slot of the hopper and adjacent to the lower edges of the side and end walls is a corrugated feeding roller 4. The shaft of the roller 4 is revolubly mounted in suitable bearings 5, formed in the ends of the frame 1, as shown.

Slidably mounted in suitable guides 6 arranged on the outer wall of one of the inclined sides of the hopper is a feed regulating plate 7, the lower edge of which is adapted to be brought more or less closely to the feeding roller 4, thereby regulating the amount of salt carried from the hopper by said roller. The plate 7 is adjustably supported in the guides 6 by threaded rods 8, having off-set lower ends which are bolted or otherwise secured to the plate 7, and on the upper portions of which are adapted to be screwed adjusting nuts 9. The nuts 9 have formed therein annular grooves 10, whereby they are revolubly secured to the side of the hopper above the plate 7 as shown. By thus revolubly securing the nuts in place, the latter may be turned in one direction or the other thereby adjusting the plate 7 to bring the edge thereof nearer to or farther from the roller 4, thus adjusting the feeding space between said plate and roller.

On one end of the shaft of the feed roller 4 is arranged an operating mechanism for imparting a step motion to the roller. This roller operating mechanism is here shown and preferably consists of a ratchet gear 11, which is rigidly secured to the shaft of the roller, and which is adapted to be engaged by a pawl 12 carried by the upper end of a rocker arm 13, which is loosely mounted on the shaft of the roller and which has formed on its opposite end a wrist pin 14 with which is adapted to be connected a pitman rod or other connection whereby said rocker arm is operatively connected with a moving part of a cracker machine or with any other suitable power whereby the arm 13 will be rocked and the pawl 12 thus engaged with the ratchet gear whereby a step motion is imparted to the feed roller.

Arranged below the feed roller 4 is a cylindrical salt distributing brush 15, the shaft of which is revolubly mounted in suitable bearings in the ends of the frame 1 and on one end of said shaft is secured a pulley wheel 16, which is adapted to be connected by a belt with a moving part of the cracker machine or with any other suitable power whereby the brush will be revolved in the proper direction to receive the salt from the roller 4 and distribute the salt over the crackers or cakes passed beneath the brush.

A salting machine such as herein shown and described may be connected with any kind of a cracker machine to uniformly apply coarse or fine salt to any kind of crackers or cakes. By means of the adjustable feeding mechanism, the quantity of salt applied to the crackers may be regulated or controlled.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention, what I claim is:—

A salting machine comprising a supporting frame, a hopper arranged therein, a feed roller revolubly mounted in said frame below the hopper, a feed regulating plate slidably mounted on the hopper, threaded adjusting rods secured to said plate, adjusting nuts arranged on said rods, means to revolubly secure said nuts to the hopper whereby when the nuts are revolved in one direction or the other the plate will be adjusted to regulate the feed of the salt from the hopper, means to impart a step motion to said roller, a salt distributing brush revolubly mounted in said frame below the roller, and a drive pulley fixed on the end of the shaft of said brush.

In testimony whereof I have hereunto set my hand in presence of two subscribing witnesses.

WILSON S. MILLER.

Witnesses:
EDWARD CRAMER,
RICHARD F. RALPH.